Sept. 26, 1950   G. A. SAGASER ET AL   2,523,594
LOW-PRESSURE ALARM FOR TIRES
Filed May 7, 1947   2 Sheets-Sheet 1
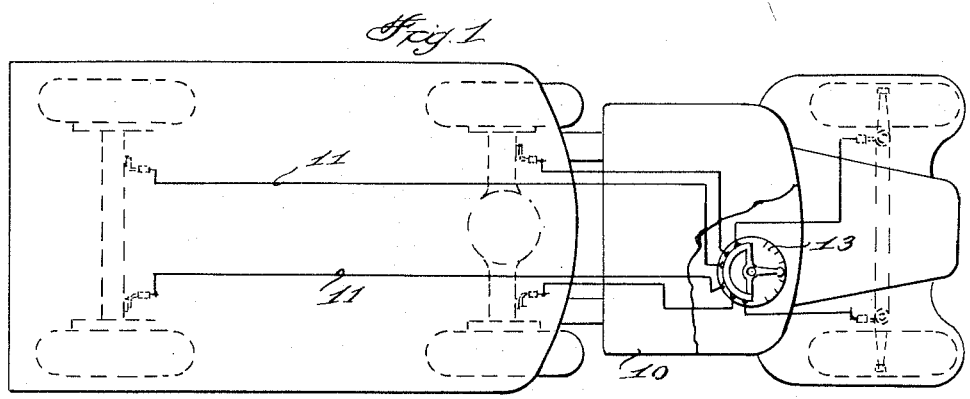
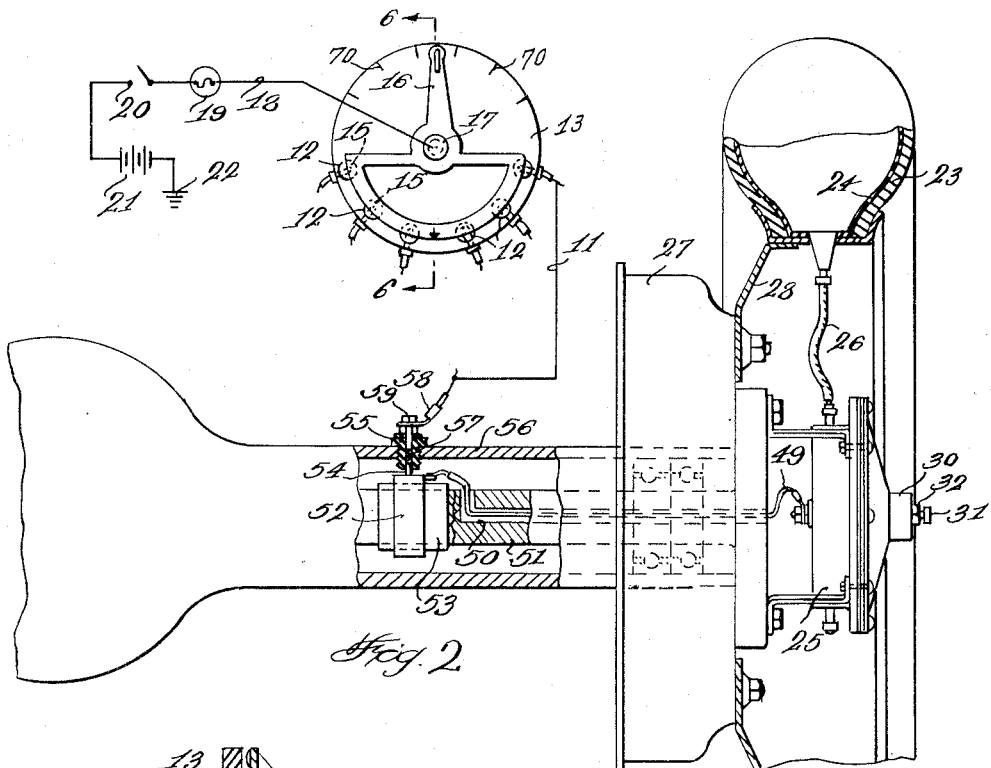
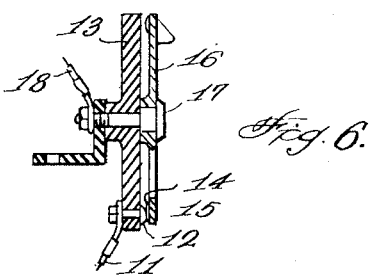
Inventors
George A. Sagaser
Harold R. Sagaser
By Randolph & Beavers
Attorneys

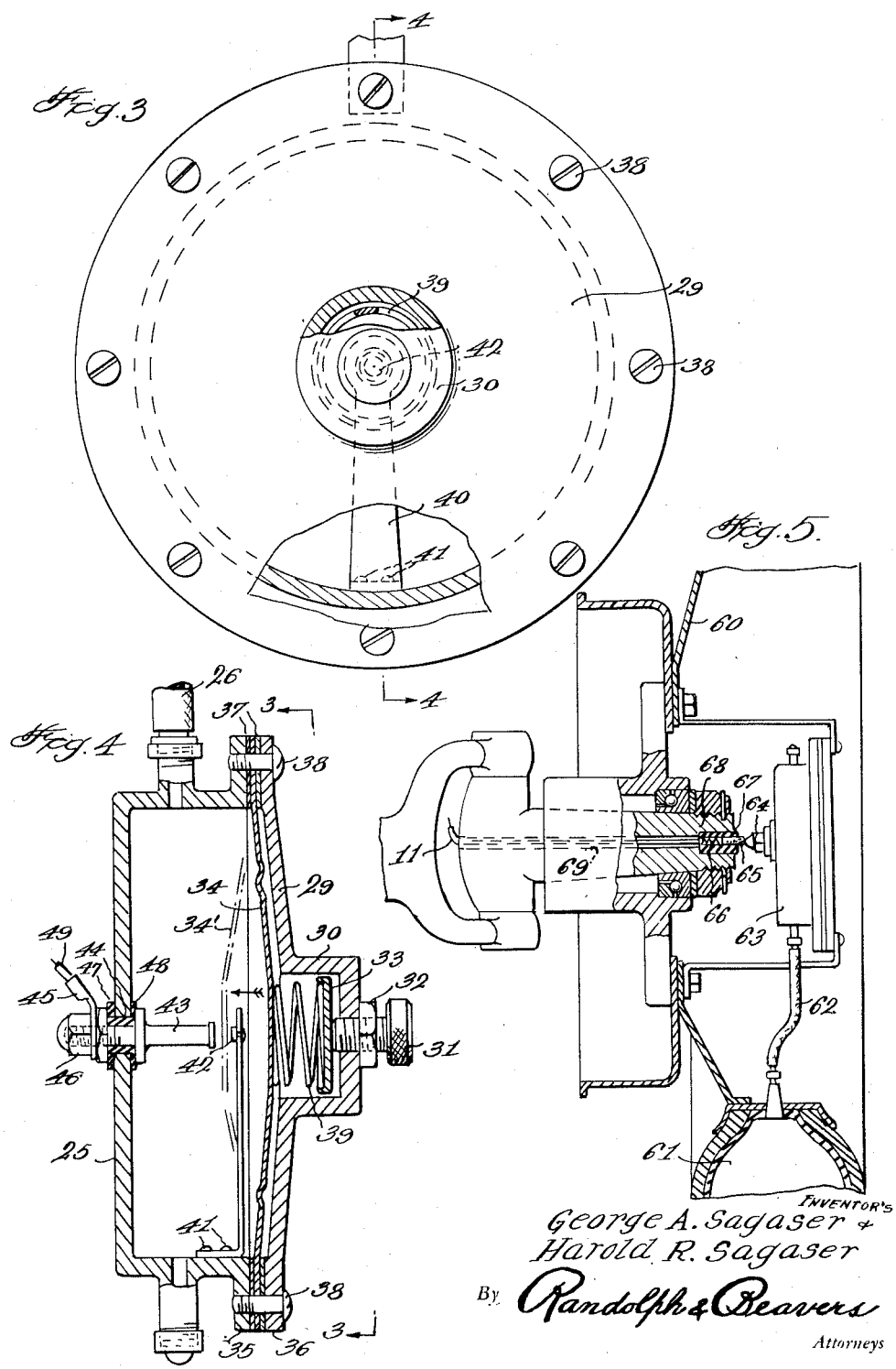

Patented Sept. 26, 1950

2,523,594

UNITED STATES PATENT OFFICE 2,523,594

LOW-PRESSURE ALARM FOR TIRES

George A. Sagaser, Upper Lake, and Harold R. Sagaser, Laton, Calif.

Application May 7, 1947, Serial No. 746,470

1 Claim. (Cl. 200—58)

The present invention relates to a low pressure alarm for tires and it consists in the combinations, constructions and arrangements of parts herein described and claimed.

Generally, the invention contemplates the provision of a switch for each of the tires of a vehicle which is normally held in open position but which may be closed upon the tire reaching a predetermined low pressure. The switch is adapted to give a visible or audible signal within the driver's compartment and means is provided whereby the operator may quickly and easily determine which particular tire has reached a dangerous pressure point.

It is an object of the invention to provide means whereby the operator of a vehicle will be automatically notified of a dangerous decrease in the air pressure of any tire associated with his vehicle.

A further object of the invention is the provision of regulating means whereby a signal switch may be closed at a predetermined pressure.

Another object of the invention is the provision of a novel means for closing an electrical switch.

A further object of the invention is the provision of novel means for transferring electrical current from a switch associated with a wheel of a vehicle through the vehicle to the driver's compartment.

Other and further objects of the invention will become apparent from a reading of the following specification taken in conjunction with the drawings, in which:

Figure 1 is a plan view of a vehicle disclosing an electrical system forming a part of the invention, Figure 2 is a fragmentary sectional view of an embodiment of the invention, Figure 3 is a vertical elevational view, partly broken away, of a portion of the invention, Figure 4 is a sectional view taken along line 4—4 of Figure 3, Figure 5 is a fragmentary sectional view of another portion of the invention, and Figure 6 is a sectional view taken along line 6—6 of Figure 2.

Referring more particularly to the drawings, there is shown therein, for example, a truck 10 provided with electrical wiring 11 connecting with mechanisms associated each with a tire of the truck, which mechanisms will be hereinafter described and with a series of contacts 12 attached to a circular base 13 mounted conveniently to the operator of a vehicle. An arcuate member 14 having a plurality of contact points 15 and an operating handle 16 is pivotally connected to the base as indicated at 17 and is provided with an electrical connection 18 which interconnects, in series, a signal 19, a switch 20, a source of electrical energy 21 and which is grounded upon the frame of the truck as indicated at 22.

Signalling means is provided whereby any one of the tires of a vehicle may close a switch upon the tire reaching a predetermined low pressure. For a rear wheel such as is indicated in Figure 2, a tire 23 is provided with a tube 24 which interconnects with a pressure chamber 25 by means of a hose connection 26. The chamber 25 is attached to the hub 27 of the wheel 28. The chamber 25 is preferably circular in shape and is provided with a cover 29 having an integrally formed outwardly extending spring cage 30 in which is threaded a regulating screw 31 provided with a lock nut 32 and which is adapted to bear against a follower plate 33. A diaphragm 34 of circular contour is mounted between a flange 35 formed on the chamber 25 and a flange 36 formed on the cover 29 and is provided with suitable gaskets 37. The flanges 35 and 36 are held tightly together by means of screws 38. A spring 39 is mounted in the spring cage 30 and is adapted to bear against the diaphragm 34 at one end and against the follower 33 at the other.

The diaphragm 34 is of the snap acting type, that is to say when a predetermnied pressure is reached within the chamber 25, the action of the spring 39 will overcome the outward resistance of the diaphragm and cause the same to quickly move to the dotted line position indicated at 34' in Figure 4.

A laterally extending contact arm 40 is securely affixed, as indicated at 41, to the inner side of the chamber 25 and extends inwardly to the center of the chamber where it is provided with a contact surface 42. Centrally affixed to the chamber 25 is a fixed contact member 43 extending through insulating collar 44 in the chamber 25 and which is provided with a positive connection 45 at its outer end. The connection 45 is adapted to be held in position by means of a nut 46 and airtight gaskets 47 and 48 are provided on the inner and outer sides of the chamber 25 adjacent the insulating member 44.

The connection 45 is provided with a lead wire 49 which is adapted to pass through a centrally located opening 50 in the axle 51 and connect with a ring 52 of conductive material which ring is mounted upon a circular insulating member 53 carried by the axle 51.

A brush 54 is mounted in a suitable insulated housing 55 in the axle housing 56 and is adapted to be held in contact with the ring 52 by means of a spring 57. The brush is provided with a permanent connection 58 held in position by a nut 59 and interconnected by means of wiring 11 with the contacts 12 as aforesaid.

For a dirigible or steering wheel 60 the tube 61 thereof is connected by a hose 62 to a pressure chamber 63 which is of identical construction with that described with relation to Figure 4 except that there is provided an outwardly projecting contact member 64 which is adapted to come into contact with a brush 65 which is urged thereagainst by means of a spring 66 carried in an insulating spring cage 67 mounted in the outer end of a spindle 68 and connected by means of a lead wire 11 which is adapted to pass through an opening 69 centrally located in the spindle 68. The wiring 11 interconnects with the contacts 12 in the driver's compartment, as aforesaid.

In operation, it will be apparent that the contact points 42 and 43 will be brought together by the snap action of the diaphragm 34 whenever the pressure within the chamber 25 reaches a predetermined low point which will indicate that the pressure in the tire associated therewith has likewise reached said predetermined point. This predetermined pressure point may be determined by adjusting the screw 31, which in turn will adjust the tension of the spring 39. Whenever contact is made between the points 42 and 43 a circuit will be completed which will include the signal 19 which may be either visible or audible in nature, thus indicating to the driver that at least one of the tires of his vehicle has reached a danger point with regard to its pressure. By revolving the handle 16 until all of the contact points 14 are out of contact with the contact points 12 and then moving the handle in a reverse direction until the signal is again seen or heard the driver will be immediately advised as to the particular tire which is endangered by indicia 70 contained on the edge of the base 13.

While but one form of the invention has been described and shown herein, it will be readily apparent to those skilled in the art that many minor modifications may be made in the invention without departing from the spirit of the invention or the scope of the appended claim.

What is claimed is:

In an automobile tire air pressure signal, a switch, said switch including an air chamber having an inlet communicating with the interior of a tire, a closure disposed over one side of the chamber, a snap-acting diaphragm, the edge portion of the diaphragm being secured with the edge portion of the closure to the chamber, said closure being concaved at its inner side to receive the diaphragm when flexed under the pressure of air in the chamber, the axial portion of the closure being provided with a cage, a spring located in the cage and bearing against the central portion of the diaphragm to urge the diaphragm inwardly and into the chamber, a stationary contact carried by the inner wall of the chamber, a yieldable contact spaced from the stationary contact and in the path of the central portion of said diaphragm and adjusting means for the spring in the form of a screw feedable into and out of the cage and provided with a pressure blade bearing against the outer end of said spring.

GEORGE A. SAGASER.
HAROLD R. SAGASER.

REFERENCES CITED

The following references are of record in the file of this patent:

UNITED STATES PATENTS

| Number | Name | Date |
|---|---|---|
| 1,140,937 | Ashelman | May 25, 1915 |
| 1,253,856 | Marquette | Jan. 15, 1918 |
| 1,880,401 | Bonham | Oct. 4, 1932 |
| 2,135,303 | Greene | Nov. 1, 1938 |
| 2,362,883 | Cecil | Nov. 14, 1944 |
| 2,381,582 | Erickson | Aug. 7, 1945 |